United States Patent
Liu et al.

(10) Patent No.: US 10,032,273 B2
(45) Date of Patent: Jul. 24, 2018

(54) MACHINE VISION SYSTEM CALIBRATION USING INACCURATE CALIBRATION TARGETS

(71) Applicant: COGNEX CORPORATION, Natick, MA (US)

(72) Inventors: Gang Liu, Natick, MA (US); David Li, West Roxbury, MA (US); Lei Wang, Wayland, MA (US)

(73) Assignee: Cognex Corporation, Natick, MA (US)

(*) Notice: Subject to any disclaimer, the term of this patent is extended or adjusted under 35 U.S.C. 154(b) by 457 days.

(21) Appl. No.: 13/835,759

(22) Filed: Mar. 15, 2013

(65) Prior Publication Data
US 2014/0267681 A1 Sep. 18, 2014

(51) Int. Cl.
H04N 17/00 (2006.01)
G06T 7/00 (2017.01)
G06T 7/80 (2017.01)

(52) U.S. Cl.
CPC .............. *G06T 7/0018* (2013.01); *G06T 7/80* (2017.01); *H04N 17/002* (2013.01); *G06T 2207/30208* (2013.01)

(58) Field of Classification Search
CPC ........ H04N 7/18; B65B 19/28; G01B 11/022; G01N 21/88; G01N 21/8806
See application file for complete search history.

(56) References Cited

U.S. PATENT DOCUMENTS

| | | | |
|---|---|---|---|
| 4,557,599 A | 12/1985 | Zimring | |
| 5,960,125 A * | 9/1999 | Michael et al. | 382/294 |
| 5,978,080 A * | 11/1999 | Michael et al. | 356/243.1 |
| 5,978,081 A | 11/1999 | Michael et al. | |
| 5,978,521 A | 11/1999 | Wallack et al. | |
| 7,171,036 B1 | 1/2007 | Liu et al. | |
| 7,495,758 B2 | 2/2009 | Walton | |
| 8,139,231 B2 | 3/2012 | Schwab et al. | |
| 8,162,584 B2 | 4/2012 | Michael et al. | |
| 8,189,194 B2 | 5/2012 | Schwab et al. | |
| 2007/0189559 A1* | 8/2007 | Haan et al. | 381/191 |
| 2014/0355193 A1* | 12/2014 | Purcocks | 361/679.17 |

* cited by examiner

*Primary Examiner* — Frank Huang
(74) *Attorney, Agent, or Firm* — Proskauer Rose LLP (57) ABSTRACT

Described are methods, systems, and apparatus, including computer program products for calibrating machine vision systems. A system includes: one or more cameras; a motion rendering device; and a calibration module. The calibration module is configured to acquire, from a first camera of the one or more cameras, a plurality of images of a calibration target comprising a calibration pattern that provides a plurality of calibration features; extract calibration features of the plurality of calibration features from the plurality of images, wherein physical positions of the plurality of calibration features are in a calibration target length unit associated with the calibration target; determine a ratio between the calibration target length unit and a motion rendering device length unit associated with the motion rendering device; and provide a first calibration for the first camera based on the ratio.

14 Claims, 4 Drawing Sheets

MACHINE VISION SYSTEM CALIBRATION USING INACCURATE CALIBRATION TARGETS

FIELD OF THE TECHNOLOGY

The present technology relates generally to machine vision systems and, more specifically, to calibrating a machine vision system.

BACKGROUND

In machine vision systems, one or more cameras can be used to perform vision system processes on an object or surface within an imaged scene. These processes can include inspection, decoding of symbology, alignment, and/or a variety of other tasks. In some applications, a machine vision system can be used to inspect a flat work piece disposed within or passing through an imaged scene. The scene can be imaged by one or more vision system cameras. The images captured by the cameras can be processed by the machine vision system to determine information about features within the imaged scene, such as features' real-world locations, poses, etc. In some applications, the camera can be calibrated to allow the machine vision system to perform vision tasks with increased accuracy and reliability.

A calibration target can be used to calibrate the cameras. A calibration target can be any object with accurately known (e.g., as a result of the manufacturing process) or measurable dimensional characteristics. For example, a calibration plate can be used as a calibration target. A calibration plate can be a flat object with a distinctive pattern made visible on its surface. The distinctive pattern can be laid out such that the machine vision system or user can easily identify visible features in an image of the calibration plate acquired by a camera. Some exemplary patterns include, but are not limited to, dot grids, line grids, a honeycomb pattern, a checkerboard of squares, a checkerboard of triangles, etc. Calibration patterns typically contain highly localizable features. The level of accuracy in localization of features can affect the accuracy of calibration. Circles (dots or holes) can be less accurate than grid or checkerboard patterns. Characteristics of each visible feature are known from the plate's design, such as the position and/or orientation relative to a reference position and/or coordinate system implicitly defined within the design. The features present in the design can include calibration features. Calibration features can be individual features in a calibration plate's design whose characteristics can be readily measured (for example, the feature's position, size, color, etc.), and whose intended characteristics by the nominal design are known. For example, some possible calibration feature positions include the corners or centers of checkerboard-pattern tiles, or the centers of dots in a dot grid, or the line crossings in a line grid. Calibration plate designs can include a large number of calibration features arranged in a repetitive pattern. More basically, a calibration feature can be readily extracted from an acquired image and can provide known characteristics. In some applications, the known dimensional characteristics are used to calibrate the machine vision system.

In some conventional systems, calibration targets have certain characteristics. For example, calibration targets are typically dimensionally stable and rigid. Calibration plates can be made from a variety of materials. In some applications, calibration plates can be made from glass (e.g., by chrome-on-glass fabrication). Glass calibration plates have characteristics that can be beneficial for machine vision system calibration. For example, the dimensions of a glass calibration plate do not significantly vary with changes in temperature and humidity (e.g., dimensionally stable). However, glass calibration plates are typically expensive. In some applications, calibration plates can be made from biaxially-oriented polyethylene terephthalate (BoPET), such as MYLAR polyester film produced by Dupont. While BoPET calibration plates typically cost less than glass calibration plates, the dimensions of BoPET calibration plates can vary with changes in temperature and/or humidity (e.g., by more than $\frac{1}{10}$th of a percent). Similarly, some metal calibration plates (e.g., calibration targets made from aluminum or steel plates) are not dimensionally stable (e.g., such calibration plates can suffer from significant thermal expansion). Paper and BoPET calibration plates are not dimensionally stable. Additionally, paper and BoPET calibration plates are not rigid, unless being affixed to a rigid supporting substrate.

SUMMARY

Accordingly, there is a need to be able to use calibration targets made from lower cost materials (such as BoPET) while automatically accounting for deformations common in those inexpensive materials that can decrease calibration accuracy.

In an aspect, a system can include one or more cameras. The system can include a motion rendering device. The system can include a calibration module configured to: acquire, from a first camera of the one or more cameras, a plurality of images of a calibration target comprising a calibration pattern that provides a plurality of calibration features; extract one or more calibration features of the plurality of calibration features from the plurality of images, wherein physical positions of the plurality of calibration features are in a calibration target length unit associated with the calibration target; determine a ratio between the calibration target length unit and a motion rendering device length unit associated with the motion rendering device; and provide a first calibration for the first camera based on the ratio between the calibration target length unit and the motion rendering device length unit.

In another aspect, a computer-implemented method of calibrating at least one camera can include acquiring, by a first camera, a plurality of images of a calibration target comprising a calibration pattern that provides a plurality of calibration features. The method can include extracting, by a machine vision system, one or more calibration features of the plurality of calibration features from the plurality of images, wherein physical positions of the plurality of calibration features are in a calibration target length unit associated with the calibration target. The method can include determining, by the machine vision system, a ratio between the calibration target length unit and a motion rendering device length unit associated with a motion rendering device. The method can include providing, by the machine vision system, a first calibration for the first camera based on the ratio between the motion rendering device length unit and the calibration target length unit.

In another aspect, a computer program product, tangibly embodied in a non-transitory computer readable storage medium, includes instructions being operable to cause a machine vision system to: acquire from a first camera a plurality of images of a calibration target comprising a calibration pattern that provides a plurality of calibration features; extract one or more calibration features of the plurality of calibration features from the plurality of images, wherein physical positions of the plurality of calibration features are in a calibration target length unit associated with the calibration target; determine a ratio between the calibration target length unit and a motion rendering device length unit associated with a motion rendering device; and provide a first calibration for the first camera based on the ratio between the motion rendering device length unit and the calibration target length unit.

In some embodiments, the calibration module is further configured to: acquire, from a second camera of the one or more cameras, a second plurality of images of the calibration target; extract a second one or more calibration features of the plurality of calibration features from the second plurality of images, wherein physical positions of the second plurality of calibration features are in the calibration target length unit associated with the calibration target; and provide a second calibration for the second camera based on the ratio between the calibration target length unit and the motion rendering device length unit.

In some embodiments, the motion rendering device is configured to move one of the calibration target and the first camera in a motion comprising at least one of a translation component and a rotation component, the motion in the motion rendering device length unit, and wherein the calibration module is configured to acquire a first image of the plurality of images of the calibration target before the motion and a second image of the plurality of images of the calibration target after the motion.

In some embodiments, the calibration module is further configured to: determine a first test calibration for the first camera based on a first test ratio; determine a first residual error for the first test calibration; determine a second test calibration for the first camera based on a second test ratio; determine a second residual error for the second test calibration; determine the ratio between the calibration target length unit and the motion rendering device length unit to be the first test ratio if the first residual error is less than the second residual error, otherwise determine the ratio between the calibration target length unit and the motion rendering device length unit to be the second test ratio; and provide the first test calibration as the first calibration if the first residual error is less than the second residual error, otherwise provide the second test calibration as the first calibration.

In some embodiments, the calibration module is further configured to perform a hand-eye calibration to calculate the first calibration for the first camera based on the ratio between the calibration target length unit and the motion rendering device length unit.

In some embodiments, the method includes acquiring, by a second camera of the one or more cameras, a second plurality of images of the calibration target; extracting, by the machine vision system, a second one or more calibration features of the plurality of calibration features from the second plurality of images, wherein physical positions of the second plurality of calibration features are in the calibration target length unit associated with the calibration target; and providing, by the machine vision system, a second calibration for the second camera based on the ratio between the calibration target length unit and the motion rendering device length unit.

In some embodiments, the method includes moving, by the motion rendering device, one of the calibration target and the first camera in a motion comprising at least one of a translation component and a rotation component, the motion in the motion rendering device length unit; and acquiring, by the first camera, a first image of the plurality of images of the calibration target before the motion and a second image of the plurality of images of the calibration target after the motion.

In some embodiments, the method includes determining, by the machine vision system, a first test calibration for the first camera based on a first test ratio; determining, by the machine vision system, a first residual error for the first test calibration; determining, by the machine vision system, a second test calibration for the first camera based on a second test ratio; determining, by the machine vision system, a second residual error for the second test calibration; determining, by the machine vision system, the ratio between the calibration target length unit and the motion rendering device length unit to be the first test ratio if the first residual error is less than the second residual error, otherwise determining the ratio between the calibration target length unit and the motion rendering device length unit to be the second test ratio; and providing, by the machine vision system, the first test calibration as the first calibration if the first residual error is less than the second residual error, otherwise providing the second test calibration as the first calibration.

In some embodiments, the method includes performing, by the machine vision system, a hand-eye calibration to calculate the first calibration for the first camera based on the ratio between the calibration target length unit and the motion rendering device length unit.

In some embodiments, the computer program product includes instructions being operable to cause the machine vision system to: acquire from a second camera a second plurality of images of the calibration target; extract a second one or more calibration features of the plurality of calibration features from the second plurality of images, wherein physical positions of the second plurality of calibration features are in the calibration target length unit associated with the calibration target; and provide a second calibration for the second camera based on the ratio between the calibration target length unit and the motion rendering device length unit.

In some embodiments, the computer program product includes instructions being operable to cause the machine vision system to: move, by the motion rendering device, one of the calibration target and the first camera in a motion comprising at least one of a translation component and a rotation component, the motion in the motion rendering device length unit; and acquire a first image of the plurality of images of the calibration target before the motion and a second image of the plurality of images of the calibration target after the motion.

In some embodiments, the computer program product includes instructions being operable to cause the machine vision system to: determine a first test calibration for the first camera based on a first test ratio; determine a first residual error for the first test calibration; determine a second test calibration for the first camera based on a second test ratio; determine a second residual error for the second test calibration; determine the ratio between the calibration target length unit and the motion rendering device length unit to be the first test ratio if the first residual error is less than the second residual error, otherwise determine the ratio between the calibration target length unit and the motion rendering device length unit to be the second test ratio; and provide the first test calibration as the first calibration if the first residual error is less than the second residual error, otherwise providing the second test calibration as the first calibration.

In some embodiments, the computer program product includes instructions being operable to cause the machine vision system to: perform a hand-eye calibration to calculate the first calibration for the first camera based on the ratio between the calibration target length unit and the motion rendering device length unit.

In some embodiments, the calibration target is a calibration plate comprising BoPET.

In some embodiments, the ratio between the calibration target length unit and the motion rendering device length unit is associated with a deformation of the calibration target associated with at least one environmental factor.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

In an illustrative application, a machine vision system can be used to align work pieces to a piece of process equipment, such as in screen printing cover lenses of cell phones, computing tablets, and flatpanel displays. For example, the work piece can be disposed on a motion stage or other motion rendering device that can move the work piece relative to the screen printing equipment. Calibration (e.g., hand-eye calibration) can improve the machine vision system's ability to accurately position the work piece relative to the screen printing equipment. In some applications, calibration can include determining the relationship between the images captured by cameras and the physical space of the scene that is imaged by the cameras. For example, calibrating a camera can include determining the mathematical transformation from the coordinate system of the images of the camera to the physical coordinate space of the scene (e.g., the motion coordinate system of the motion rendering device). In some applications, a calibration for a camera can refer, in part, to such a transformation.

Calibration can be performed with a calibration target, such as a calibration plate. Calibration targets can include a calibration target coordinate system printed on the calibration target. For example, some calibration targets can include can include a grid, where the lines of the grid are designed to be evenly spaced to form a coordinate system. A calibration plate can include a grid where the grid lines are designed to be 1 cm apart. As noted above, some calibration plate materials can deform (e.g., due to thermal expansion or contraction). Accordingly, while the nominal (e.g., as designed) distance between the lines of the grid is 1 cm, the actual distance between the lines of the grid can be larger or smaller (e.g., 1.001 cm or 0.999 cm).

The technology described herein can be used to calibrate machine vision systems using calibration targets with nominal dimensions that can differ from actual dimensions. In some embodiments, the technology can automatically determine a scaling ratio for the calibration target (e.g., the ratio of the target's nominal length unit to the target's actual length unit), thereby permitting calibration using the calibration target's coordinate system while reducing calibration error. In some embodiments, the technology can use the precision of a motion rendering device (e.g., motion stage) as a dimensional standard to determine how the calibration target's nominal length unit relates to actual lengths. For example, a calibration target with a grid of nominally 1 cm squares can be fixed to the motion rendering device. A camera can capture a first image of the calibration target at this first pose. The motion rendering device can be instructed to move the calibration target by a certain translation, such as to move the calibration target to the left by 1 cm. The camera can capture a second image of the calibration target at this second pose. Because the squares are nominally 1 cm on each side, it can be expected that the calibration target will be observed moving one square to the left between the two poses. If the calibration target has expanded, the observed motion between the poses will be smaller than 1 square. If the calibration target has contracted, the observed motion will be larger than 1 square. Beneficially, the technology can determine the scaling ratio based on differences between the expected motion (e.g., as expected based on the nominal length unit of the calibration target) and the observed motion after translating the calibration target with the motion rendering device.

Figure 1:
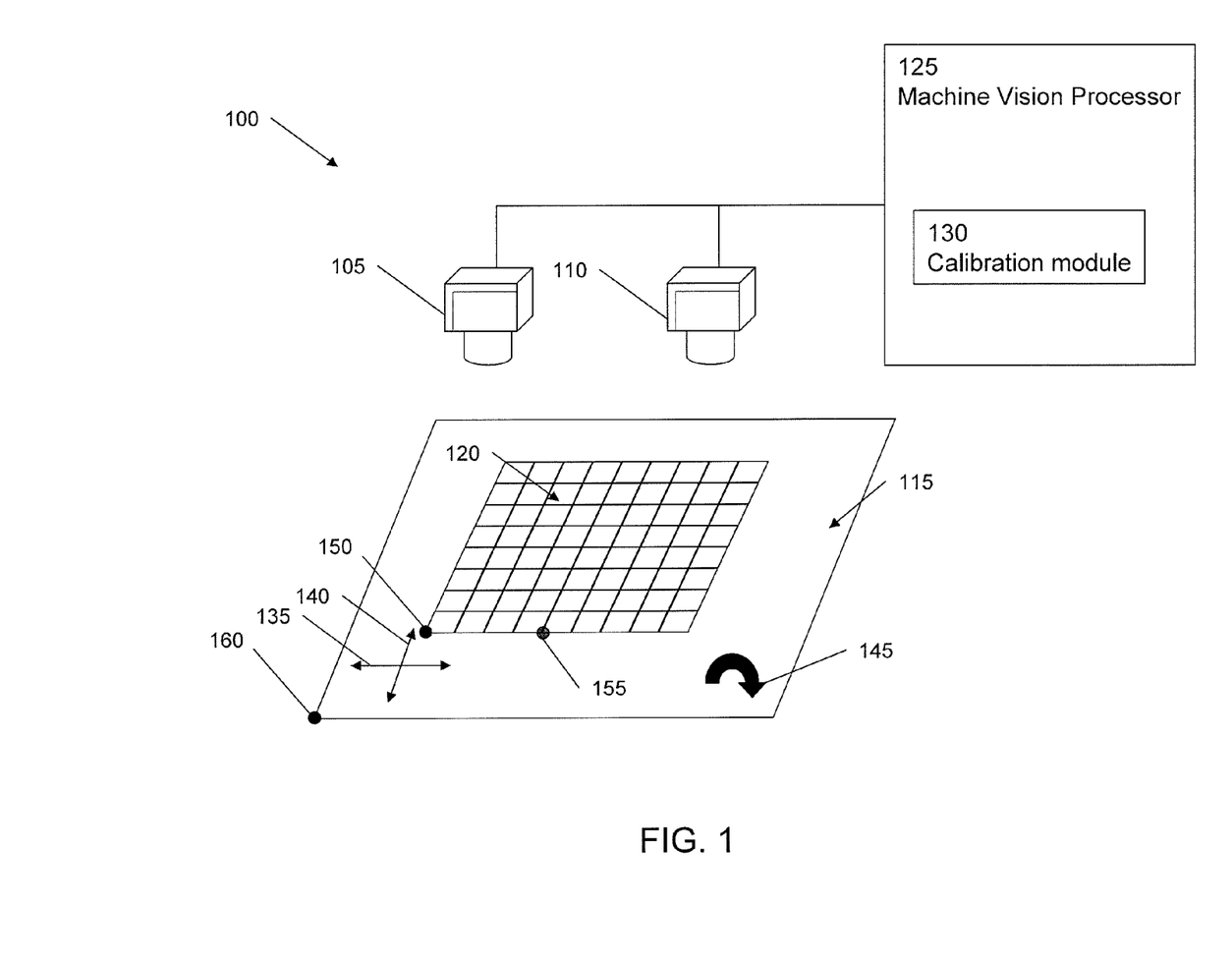
FIG. 1 depicts a diagram of a machine vision system.

With reference to the figures, FIG. 1 depicts a diagram of machine vision system 100. Machine vision system 100 includes cameras 105 and 110 generally directed toward a scene including motion rendering device 115. As illustrated, calibration target 120 is disposed on motion rendering device 115. Machine vision system 100 includes machine vision processor 125, which includes calibration module 130.

Camera 105 and/or camera 110 can capture images of the scene including calibration target 120. In some embodiments, motion rendering device 115 can translate along x axis 135 and/or y axis 140, thereby translating calibration target 120. In some embodiments, motion rendering device 115 can rotate (e.g., about axis 145). In some embodiments, the calibration target 120 can be stationary with respect to the imaged scene, and one or more cameras can be movable relative to the scene. The images acquired by camera 105 and/or camera 110 can be transmitted (e.g., via appropriate wireless, hard-wired or other communication channel/link known) to machine vision processor 125.

In the illustrative embodiment, calibration target 120 is designed to have a nominal width of 9 cm and a nominal height of 8 cm. Each of the squares of calibration target is nominally 1 cm long on each side. In some embodiments, a calibration target can have a different size and shape. As is known to those of skill in the art, a calibration target 120 can vary from several millimeters in width and height to several meters, depending upon the particular application and size of the object or surface being analyzed in runtime operation of the machine vision system.

While machine vision system 100 is depicted with two cameras, camera 105 and camera 110, some embodiments of the technology can include machine vision systems with a fewer or greater number of cameras, all generally directed toward a scene. In some embodiments, a single camera (e.g., camera 105) can be used to image the scene. Motion (e.g., as provided by motion rendering device 115), can be characterized as translational motion, rotational motion, or a combination of translation and rotation. While motion rendering device 115 is shown as capable of translation along x axis 135 and/or y axis 140, some embodiments of the technology can provide three dimensional (3D) motion, including at least one of a translation component along a z axis that is perpendicular to the plane defined by the x and y axes, and/or tilt/rotation out of the x-y plane. In some embodiments, a machine vision system can include an internal processor and other components that allow it to act as a standalone unit, providing output data (e.g. feature information) to a downstream process. The processor can be entirely self-contained within the camera body, partially contained within the body, or external to the body (as shown in FIG. 1).

Figure 2A:
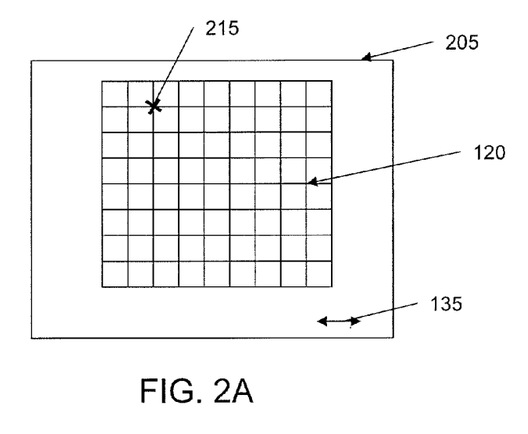
FIGS. 2A and 2B depict images of a calibration target captured by a camera.
Figure 2B:
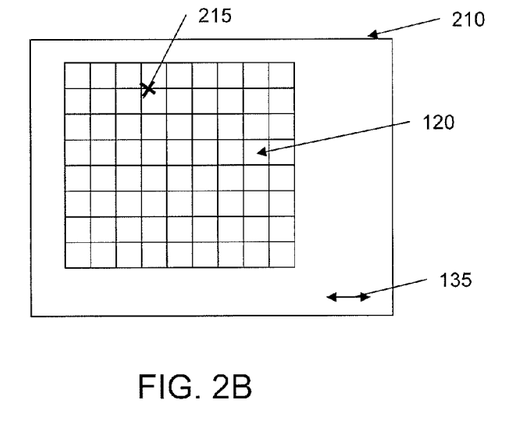

FIGS. 2A and 2B depict images of calibration target 120 captured by camera 105. FIG. 2A depicts image 205 of calibration target 120 at a first pose. A pose can refer to the position and/or orientation of calibration target 120 in the motion coordinate system of motion rendering device 115. Mark 215 is included for illustrative purposes and is positioned at a static location in the image coordinate system of camera 105. FIG. 2B depicts image 210 of calibration target 120 at a second pose, in which motion rendering device 115 has moved calibration target 120 1 cm to the left along x axis 135 from the first pose. Based on the nominal dimensions of calibration target 120, mark 215 is expected to have moved one square (nominally 1 cm) to the right along x axis 135, relative to calibration target 120. As shown in FIG. 2B, mark 215 has moved more than 1 square, indicating that calibration target 120 has contracted such that its squares are smaller than 1 cm on each side. As described in greater detail below, the technology can determine a scaling ratio for calibration target 120 (e.g., the ratio of the nominal length unit of calibration target 120 to the actual length unit of calibration target 120). For example, the technology can assume motion rendering device 115 is sufficiently accurate and determine (or approximately determine) the ratio of the nominal length unit of calibration target 120 to the actual length unit of calibration target 120 by determining the ratio of the nominal length unit of calibration target 120 to the length unit of motion rendering device 115, thereby allowing calibration using calibration target 120.

Figure 3:
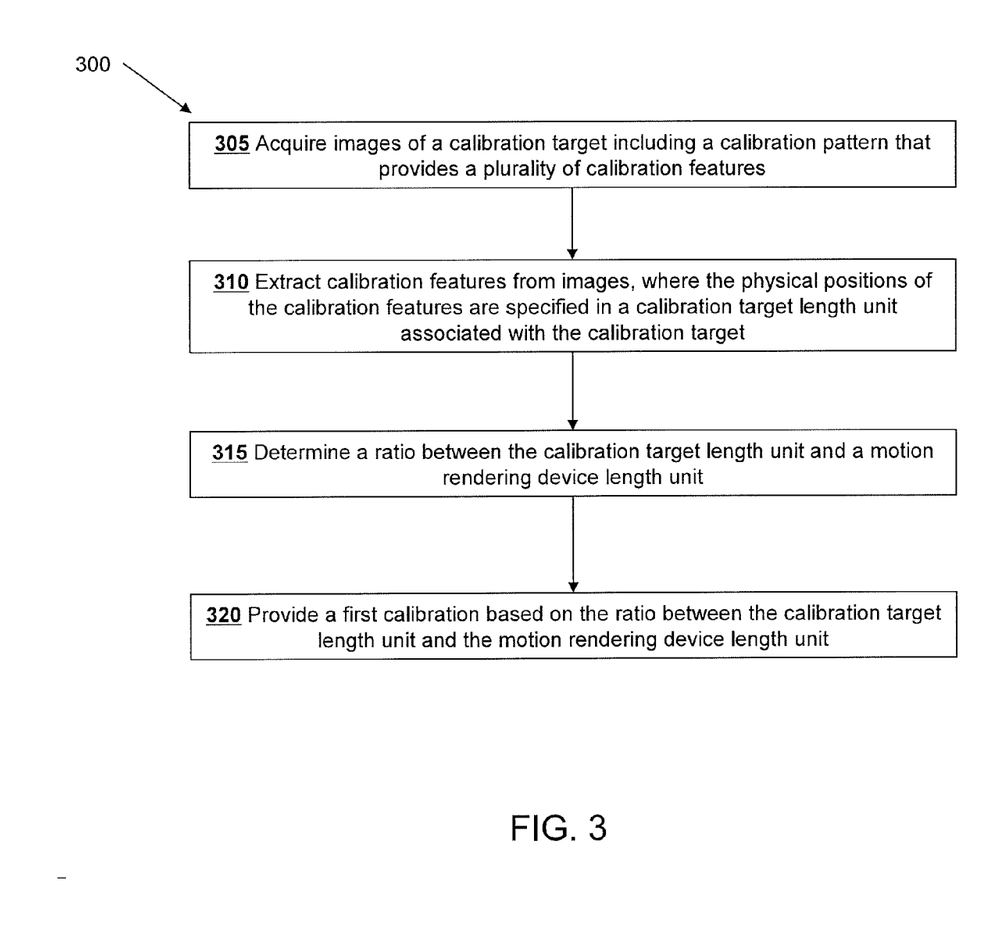
FIG. 3 depicts a flow chart of a method for determining a calibration for a camera.

FIG. 3 depicts flow chart 300 of a method for determining a calibration for a camera. The method can be executed by, for example, calibration module 130 of machine vision processor 125. In some embodiments, machine vision system 100 can utilize the grid of calibration target 120 to calibrate camera 105 in accordance with the described method. At step 305, images of a calibration target including a calibration pattern that provides a plurality of calibration features are acquired. For example, referring to FIG. 1, camera 105 can acquire a plurality of images of calibration target 120. As described above, camera 105 can acquire images of calibration target 120 at multiple poses (e.g., images 205 and 210).

At step 310, calibration features are extracted from the images, where the physical positions of the calibration features are specified in a calibration target length unit associated with the calibration target. For example, one or more of the intersecting lines of the grid on calibration target 120 can be calibration features. Calibration features can be extracted from the image using a commercially available machine vision software, such as the Cognex Vision Library (CVL®) software, produced by Cognex Corporation. Each calibration feature can be associated with two coordinate locations: the image location of the calibration feature in the image coordinate system and the physical position of the calibration feature in the physical coordinate system. In some embodiments, the physical position of the calibration feature can be expressed, at least in part, in the nominal length unit of calibration target 120. For example, with reference to FIG. 1, the physical location of calibration feature 155 can be expressed as nominally 4 cm (e.g., 4 squares) to the right of origin of the calibration target 150. The physical position of calibration feature 155 in the motion coordinate system can be determined based on the pose of calibration target 120 in the motion coordinate system, as in traditional hand-eye calibration, and the location of calibration feature 155 expressed in the nominal length unit of calibration target 120, relative to origin 150.

At step 315, a ratio between the calibration target length unit and a motion rendering device length unit is determined. In some embodiments, the technology can determine the ratio of the nominal length unit of calibration target 120 to the length unit of motion rendering device 115. Exemplary methods of determining the ratio are described in greater detail below with reference to FIGS. 4 and 5.

At step 320, a first calibration is provided based on the ratio between the calibration target length unit and the motion rendering device length unit. In some embodiments, a calibration based on the ratio between the calibration target length unit and the motion rendering device length unit can be calculated when determining the ratio between the calibration target length unit and the motion rendering device length unit, such as described with respect FIG. 4. In some embodiments, a calibration based on the ratio between the calibration target length unit and the motion rendering device length unit can be calculated using a commercially available machine vision calibration software, such as the CVL® software, produced by Cognex Corporation. In some embodiments, a standard hand-eye calibration can be performed, where the physical location of each calibration feature is scaled by the scaling ratio before being used for the calibration.

Beneficially, the calibration based on the ratio between the calibration target length unit and the motion rendering device length unit can compensate for deformation of the calibration target while still permitting the calibration features of the calibration target to be used. Without such compensation, calibration can be less accurate.

Figure 4:
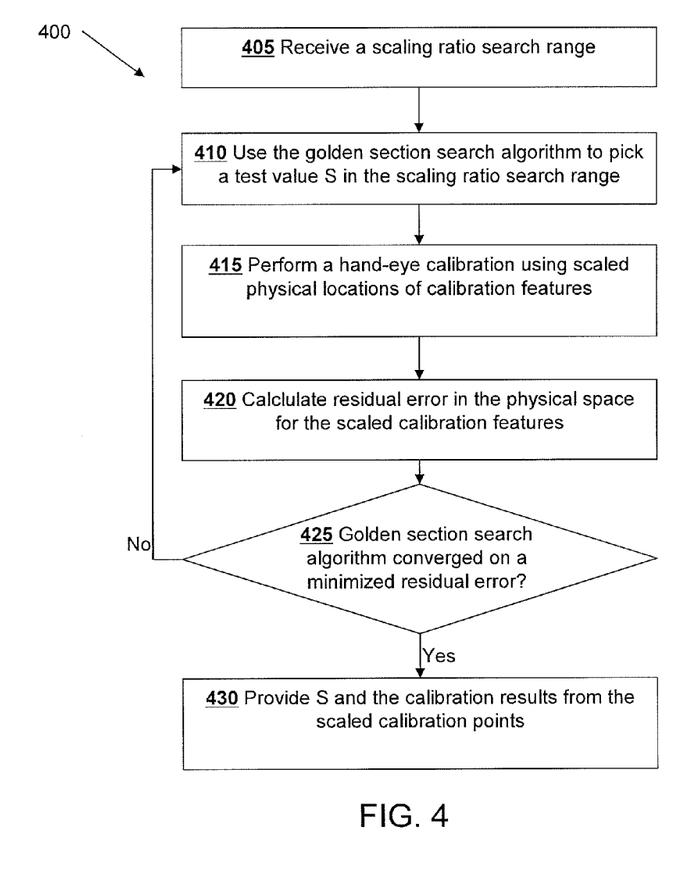
FIG. 4 depicts a flow chart of a method for determining a scaling ratio between the calibration target length unit and the motion rendering device length unit.

FIG. 4 depicts flow chart 400 of a method for determining a scaling ratio between the calibration target length unit and the motion rendering device length unit. The method can be executed by, for example, calibration module 130 of machine vision processor 125. At step 405, a scaling ratio search range is received. For example, the search range can be between 0.9 and 1.1, or [0.9, 1.1]. In some embodiments, calibration module 130 can receive the search range from memory (not shown) within machine vision system 125 (e.g., a predetermined range can be stored by machine vision system 125). In some embodiments, the search range can be received from a user (e.g., the user can provide the search range based on the expected expansion/contraction bounds of the material from which the calibration target is made).

At step 410, the golden section search algorithm is used to pick a scaling ratio test value, S, from the search range. At step 415, a hand-eye calibration using scaled physical locations of calibration features is performed. For example, the CVL® software, produced by Cognex Corporation, can be used to perform the calibration. As described above, the physical location of calibration features can be expressed in the nominal units of the calibration target. The physical location coordinates can be scaled by the scaling ratio test value. For example, with reference to FIG. 1, the physical location of calibration feature 155 can be expressed as nominally 4 cm (e.g., 4 squares) to the right of origin of the calibration target 150. The physical location of calibration feature 155 can be scaled by the scaling ratio test value by, for example, multiplying S by 4 cm to obtain the scaled distance from origin of the calibration target 150. The physical position of calibration feature 155 in the motion coordinate system can be expressed based on the pose of calibration target 120 in the motion coordinate system, as in traditional hand-eye calibration, and the location of calibration feature 155, expressed in the scaled nominal length unit of calibration target 120, relative to origin 150.

At step 420, a residual error is calculated in the physical space for the scaled calibration feature points. For example, the CVL® software, produced by Cognex Corporation, can be used to calculate the residual error in the motion coordinate system. In some embodiments, the residual error can be the average of the residual errors for each calibration point across each image. In some embodiments, it can be the sum of the residual errors for each calibration point across each image.

At step 425, it is determined whether the golden section search algorithm converged on a minimum residual error (e.g., whether the residual error for the current scaling ratio test value is the minimum for any scaling ratio in the scaling ratio search range). If the residual error is not the minimum, the method returns to step 410, where a new scaling test value S is picked and steps 415, 420, and 425 are repeated using the new test value. If the residual error is the minimum for the search range, at step 430, the last used scaling ratio test value is determined to be the ratio between the calibration target length unit and the motion rendering device length unit. The ratio between the calibration target length unit and the motion rendering device length unit and the calibration calculated using the ratio is provided.

While the method illustrated in FIG. 4 uses the golden section search algorithm, it should be appreciated other numerical algorithms can be substituted to find the minimum residual error. Additionally, while the method illustrated in FIG. 4 uses a single scaling ratio, the technology can use one or more scaling ratios to account for non-uniform expansion/contraction (e.g., expansion/contraction by a different amount along the x axis than along the y axis).

In some embodiments, a scaling ratio can be determined (e.g., estimated or approximated) during hand-eye calibration by modeling the scaling ratio, along with other unknown variables modeled during hand-eye calibration. For example, a scaling ratio can be estimated during determination of the calibration target placement pose. Generally, the calibration target placement pose can refer to how the calibration target is placed, e.g., on a motion stage. The calibration target placement pose can be a rigid body pose consisting of a rotation component R and a translation component T. Referring to FIG. 1, for example, the placement pose of calibration target 120 can describe how calibration target 120 is placed on motion rendering device 115. The rotation component R can describe the relative rotation between calibration target 120 and motion rendering device 115. The translation component T can describe the offset between origin of the calibration target 150 and origin of the motion rendering device 160.

More generally, the rotation component can be represented by the following 2×2 rotation matrix, for a rotation angle A:

$$R(A) = \begin{bmatrix} \cos(A) & -\sin(A) \\ \sin(A) & \cos(A) \end{bmatrix}$$

The translation component T can be represented by the following 2×1 vector, where $offset_x$ and $offset_y$ describe the offset between the origin of the calibration target and the origin of the motion rendering device in the motion rendering device's length unit as follows:

$$T = \begin{bmatrix} offset_x \\ offset_y \end{bmatrix}$$

Referring again to FIG. 1, for example, a position P (e.g., a 2×1 vector) for calibration feature 155 in the coordinate system defined by calibration target 120 and in calibration target 120's length unit (e.g. in nominally 1 cm tiles) can be found. The physical position of calibration feature 155 (e.g., the position in the coordinate system of motion rendering device 115) can be found by converting P into Q (e.g., a 2×1 vector) in the motion rendering device's length unit by applying the scaling ratio S, followed by applying the rotation component R and the translation component T of the placement pose to get the physical position V of calibration feature 155 in motion rendering device 115's coordinate system. More generally, the relationship is modeled by the following equation for V:

$$V=R(A)*Q+T=R(A)*S*P+T$$

Even more generally, S can be a 2×2 matrix that models separate x-scale $S_x$, y-scale $S_y$, and a skew k between the X and Y axes of the calibration pattern:

$$S = \begin{bmatrix} S_x & k \\ 0 & S_y \end{bmatrix}$$

In a simplified modeling (e.g., uniform scale), $S_x=S_y=S$ and k=0.

Conventional hand-eye calibration estimates A and T based on information collected during calibration feature extraction (e.g., step 310 in FIG. 3). In some embodiments, the technology introduces new unknown variables of S (e.g., either a uniform scaling ratio, or separate X-scale, Y-scale, and skew). Using techniques well known to those of skill in the art (e.g., least squares fitting to minimize residual error), A, T, and S can be estimated using the relationship described above, thereby determining the scaling ratio between the calibration target length unit and the motion rendering device length unit.

For example, a method of hand-eye calibration is described in U.S. Pat. No. 5,960,125, issued Sep. 28, 1999, and titled "Nonfeedback-Based Machine Vision Methods For Determining a Calibration Relationship Between a Camera and a Moveable Object," the entire contents of which are hereby incorporated by reference. In some embodiments of the present technology, a calibration can be performed by minimizing error $E_{ij}$ in accord with the following relationship:

$$E_{i,j} = \left\| \begin{bmatrix} \cos\theta_j & -\sin\theta_j \\ \sin\theta_j & \cos\theta_j \end{bmatrix} \begin{bmatrix} \cos\theta_c & -\sin\theta_c \\ \sin\theta_c & \cos\theta_c \end{bmatrix} \begin{bmatrix} S_x & k \\ 0 & S_y \end{bmatrix} \begin{bmatrix} w_x \\ w_y \end{bmatrix} + \right.$$

-continued $$\left[\begin{bmatrix} x_c \\ y_c \end{bmatrix}\right]\begin{bmatrix} m_{xj} \\ m_{yj} \end{bmatrix} - \begin{bmatrix} O_{xi} \\ O_{yi} \end{bmatrix} - \begin{bmatrix} \alpha U & \beta V \\ \alpha V & \beta U \end{bmatrix}\begin{bmatrix} i_{xij} \\ i_{yij} \end{bmatrix}$$

where each of the variables is as described in U.S. Pat. No. 5,960,125 and $$\begin{bmatrix} S_x & k \\ 0 & S_y \end{bmatrix}$$

is a scaling matrix as described above. In minimizing the error, $S_x$, $S_y$, and k can be estimated.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. A depicted processor, component, or module can be combined with any other processor, component, or module or divided into various subprocessors, subcomponents, or submodules. Such can be variously combined according to embodiments herein.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A system comprising:
   one or more cameras;
   a motion rendering device; and
   a calibration module configured to:
   acquire, from a first camera of the one or more cameras, a plurality of images of a calibration target comprising a calibration pattern that provides a plurality of calibration features, wherein one or more dimensions of the calibration target are deformed due to at least one environmental factor;
   extract one or more calibration features of the plurality of calibration features from the plurality of images, wherein physical positions of the plurality of calibration features are in a calibration target length unit associated with the calibration target;
   determine a scaling matrix between the calibration target length unit and a motion rendering device length unit associated with the motion rendering device, comprising:
   a) receiving a scaling matrix search range,
   b) determining a test value in the scaling matrix search range,
   c) performing a test calibration using physical location coordinates of the one or more calibration features, the physical location coordinates of the one or more calibration features being scaled by the test value,
   d) determining a residual error based upon the scaled physical location coordinates, e) repeating steps b)-d) above with a different test value in the scaling matrix search range until the residual error is a minimum, and f) using the test value corresponding to the minimum residual error as the scaling matrix; and provide a first calibration for the first camera based on the scaling matrix between the calibration target length unit and the motion rendering device length unit.

2. The system of claim 1, wherein the calibration module is further configured to:

acquire, from a second camera of the one or more cameras, a second plurality of images of the calibration target;

extract a second one or more calibration features of the plurality of calibration features from the second plurality of images, wherein physical positions of the second plurality of calibration features are in the calibration target length unit associated with the calibration target; and provide a second calibration for the second camera based on the scaling matrix between the calibration target length unit and the motion rendering device length unit.

3. The system of claim 1, wherein the motion rendering device is configured to move one of the calibration target and the first camera in a motion comprising at least one of a translation component and a rotation component, the motion in the motion rendering device length unit, and wherein the calibration module is configured to acquire a first image of the plurality of images of the calibration target before the motion and a second image of the plurality of images of the calibration target after the motion.

4. The system of claim 1, wherein the calibration target is a calibration plate comprising BoPET.

5. The system of claim 1, wherein the calibration module is further configured to:

perform a hand-eye calibration to calculate the first calibration for the first camera based on the scaling matrix between the calibration target length unit and the motion rendering device length unit.

6. A computer-implemented method of calibrating at least one camera comprising:

acquiring, by a first camera, a plurality of images of a calibration target comprising a calibration pattern that provides a plurality of calibration features, wherein one or more dimensions of the calibration target are deformed due to at least one environmental factor;

extracting, by a machine vision system, one or more calibration features of the plurality of calibration features from the plurality of images, wherein physical positions of the plurality of calibration features are in a calibration target length unit associated with the calibration target;

determining, by the machine vision system, a scaling matrix between the calibration target length unit and a motion rendering device length unit associated with a motion rendering device, comprising:

a) receiving a scaling matrix search range, b) determining a test value in the scaling matrix search range, c) performing a test calibration using physical location coordinates of the one or more calibration features, the physical location coordinates of the one or more calibration features being scaled by the test value, d) determining a residual error based upon the scaled physical location coordinates, e) repeating steps b)-d) above with a different test value in the scaling matrix search range until the residual error is a minimum, and f) using the test value corresponding to the minimum residual error as the scaling matrix; and providing, by the machine vision system, a first calibration for the first camera based on the scaling matrix between the motion rendering device length unit and the calibration target length unit.

7. The method of claim 6, further comprising:

acquiring, by a second camera of the one or more cameras, a second plurality of images of the calibration target;

extracting, by the machine vision system, a second one or more calibration features of the plurality of calibration features from the second plurality of images, wherein physical positions of the second plurality of calibration features are in the calibration target length unit associated with the calibration target; and providing, by the machine vision system, a second calibration for the second camera based on the scaling matrix between the calibration target length unit and the motion rendering device length unit.

8. The method of claim 6, further comprising:

moving, by the motion rendering device, one of the calibration target and the first camera in a motion comprising at least one of a translation component and a rotation component, the motion in the motion rendering device length unit; and acquiring, by the first camera, a first image of the plurality of images of the calibration target before the motion and a second image of the plurality of images of the calibration target after the motion.

9. The method of claim 6, wherein the calibration target is a calibration plate comprising BoPET.

10. The method of claim 6, further comprising:

performing, by the machine vision system, a hand-eye calibration to calculate the first calibration for the first camera based on the scaling matrix between the calibration target length unit and the motion rendering device length unit.

11. A computer program product, tangibly embodied in a non-transitory computer readable storage medium, comprising instructions being operable to cause a machine vision system to:

acquire from a first camera a plurality of images of a calibration target comprising a calibration pattern that provides a plurality of calibration features, wherein one or more dimensions of the calibration target are deformed due to at least one environmental factor;

extract one or more calibration features of the plurality of calibration features from the plurality of images, wherein physical positions of the plurality of calibration features are in a calibration target length unit associated with the calibration target;

determine a scaling matrix between the calibration target length unit and a motion rendering device length unit associated with a motion rendering device, comprising:

a) receiving a scaling matrix search range, b) determining a test value in the scaling matrix search range, c) performing a test calibration using physical location coordinates of the one or more calibration features, the physical location coordinates of the one or more calibration features being scaled by the test value, d) determining a residual error based upon the scaled physical location coordinates, e) repeating steps b)-d) above with a different test value in the scaling matrix search range until the residual error is a minimum, and f) using the test value corresponding to the minimum residual error as the scaling matrix; and provide a first calibration for the first camera based on the scaling matrix between the motion rendering device length unit and the calibration target length unit.

12. The computer program product of claim 11, further comprising instructions being operable to cause the machine vision system to:

acquire from a second camera a second plurality of images of the calibration target;

extract a second one or more calibration features of the plurality of calibration features from the second plurality of images, wherein physical positions of the second plurality of calibration features are in the calibration target length unit associated with the calibration target; and provide a second calibration for the second camera based on the scaling matrix between the calibration target length unit and the motion rendering device length unit.

13. The computer program product of claim 11, further comprising instructions being operable to cause the machine vision system to:

move, by the motion rendering device, one of the calibration target and the first camera in a motion comprising at least one of a translation component and a rotation component, the motion in the motion rendering device length unit; and acquire a first image of the plurality of images of the calibration target before the motion and a second image of the plurality of images of the calibration target after the motion.

14. The computer program product of claim 11, further comprising instructions being operable to cause the machine vision system to:

perform a hand-eye calibration to calculate the first calibration for the first camera based on the scaling matrix between the calibration target length unit and the motion rendering device length unit.

* * * * *